United States Patent [19]

Taylor

[11] Patent Number: 5,487,346
[45] Date of Patent: Jan. 30, 1996

[54] SOIL INJECTION SYSTEM

[76] Inventor: Donald K. Taylor, 1007 Tiki Dr., Galveston, Tex. 77554

[21] Appl. No.: 179,249

[22] Filed: Jan. 10, 1994

[51] Int. Cl.$^6$ .......................... A01G 25/16; A01C 23/04
[52] U.S. Cl. ............... 111/127; 222/61; 222/397; 222/400.5; 137/568; 137/627
[58] Field of Search .................. 111/127, 200, 111/118; 222/61, 397, 400.5; 137/565, 627, 568

[56] References Cited

U.S. PATENT DOCUMENTS

| | | | |
|---|---|---|---|
| 2,930,334 | 3/1960 | Marron et al. | 111/127 |
| 2,988,025 | 6/1961 | Johnston | 111/127 |
| 3,012,526 | 12/1961 | Baldwin et al. | 111/127 |
| 3,017,057 | 1/1962 | Reed | 137/568 X |
| 3,330,070 | 7/1967 | Ferm et al. | 47/9 |
| 3,718,158 | 2/1973 | Schön | 137/568 X |
| 3,815,525 | 6/1974 | Kainson et al. | 111/127 |
| 4,009,666 | 1/1977 | Russell et al. | 111/127 |
| 4,481,894 | 11/1984 | Brenn . | |
| 4,624,193 | 11/1986 | Johnston . | |
| 4,807,544 | 2/1989 | Cross et al. . | |
| 4,877,055 | 10/1989 | Knuchel et al. | 137/568 |
| 4,907,516 | 3/1990 | Rogers | 111/127 |
| 4,970,973 | 11/1990 | Lyle et al. | 111/127 |
| 5,101,745 | 4/1992 | Podevels et al. | 111/127 |
| 5,207,168 | 5/1993 | Comer | 111/200 |

OTHER PUBLICATIONS

"Liquid Pulse Injector (LPI)", Rogers Innovative, Inc. brochure, Jan. 1993.
"HydroJect 3000," The Toro Company, 1993.

Primary Examiner—Randolph A. Reese
Assistant Examiner—Christopher J. Novosad
Attorney, Agent, or Firm—Guy McClung

[57] ABSTRACT

A fluid injecting system for injecting fluid into soil is disclosed, the system comprising a tank for receiving and from which is discharged the fluid, mixing apparatus in the tank for mixing the fluid, a transfer pump in fluid communication with the mixing tank, a high pressure pump, the transfer pump in fluid communication with the high pressure pump for pumping fluid from the mixing tank to the high pressure pump, sequencing pumping apparatus for providing sequential charges of fluid to a nozzle apparatus, and nozzle apparatus with at least one nozzle through which fluid is injected into the soil, the sequencing pumping apparatus in fluid communication with the nozzle apparatus. In one aspect an accumulator accumulates a charge of fluid which is supplied to the nozzle apparatus. In one aspect the sequencing pumping apparatus includes a pneumatically controlled sequencing control valve which responds to precise pressure changes to control the duration of fluid pulses.

18 Claims, 1 Drawing Sheet

SOIL INJECTION SYSTEM

BACKGROUND OF THE INVENTION

1. Field of The Invention

This invention is related to soil injection systems; and, one aspect, to such a system with effective control of jetted material; with efficient injection with relatively small amounts of chemical(s), in an environmentally safe manner and at relatively low, controlled pressures; and with thorough mixing of material to be injected.

1. Description of Related Art

The prior art discloses a wide variety of soil injection systems developed over many decades for injecting various substances in to soil U.S. Pat. No. 3,815,525 discloses apparatus for intermittent injection of liquid into soil at a pulse pressure of 1000 to 3500 arm. Liquid under high pressure is injected into the root zone of plants in soil by the action of accumulated impact energy in the form of continuous pulse jets by a device for effecting injection of liquid which has a chamber adapted to accumulate the liquid and a nozzle disposed in the lower portion of the chamber and adapted to discharge liquid as pulse jets. A plunger is accommodated in the chamber, reciprocated to transmit an impact to the liquid and is connected to a resilient compression member adapted to accumulate energy.

U.S. Pat. No. 4,907,516 discloses apparatus for pulsed injection of liquid into soil at 6000 p.s.i. A pressure regulator and control unit with solenoid valve is used. Fertilizer or other liquid crop treatment is applied to the ground using a direct injection jet with a nozzle position closely adjacent the ground and forming a jet of the liquid directed into the ground. A solenoid controlled valve cyclically baits the flow of fluid to form short pulses of the fluid so that the fluid can be supplied in concentrate form while generating sufficient energy to achieve a depth of penetration in the range two to four inches. The solenoid controlled valve and nozzle is mounted on a skid member carried on a depth control wheel. The period of the pulses is arranged so that the length of a pulse is very short relative to the spacing between the pulses with the spacing between adjacent rows formed by adjacent heads being substantially equal to the spacing between the individual pulses.

U.S. Pat. No. 3,330,070 discloses injection apparatus mountable behind a tractor which includes a compressor, control valves and a reservoir maintained at a desired pressure for injecting one to two gallons per minute of petroleum based emulsions delivered at thirty to sixty p.s.i.

U.S. Pat. No. 4,970,973 discloses a field planting system which employs: accumulators, microprocessor controllers, pumps, an air compressor, and venting apparatus. The system is used to apply water, chemicals, herbicides, pesticides, and fertilizers in conjunction with planting seeds.

U.S. Pat. No. 5,101,745 discloses a system for injecting liquid into soil at 2300 to 5500 p.s.i with pulses 0.010 to 0.065 seconds apart. The system uses an accumulator and control valves and has a roller assembly for applying mechanical pressure to turf after cultivation with a means for setting a first speed in a transport mode and a second speed in a cultivating mode. The apparatus is bidirectional to allow the apparatus to be used in both a forward and reverse direction. The flow of the pressurized liquid is controlled at intervals through nozzles having diameters of from about 0.033 to about 0.090 inches. The apparatus utilizes a water hammer effect to effect the flow of pressurized liquid out of the nozzles and discloses a relationship in the pressure and pounds per square inch of the cross-sectional area of the bore of the manifold to the accumulated area of the output ports of the nozzles.

U.S. Pat. No. 4,807,544 discloses a liquid injection system with an emergency bypass valve and an air compressor and a method and apparatus for injecting agrochemicals into the subsurface of the soil without tilling of the soil. A high pressure pump delivers the solution to be injected to a series of injection nozzles. The injection nozzles cause liquid jets to be formed which have sufficient velocity and narrow cross-section to inject into the soil. The injection nozzles are supported by a shield-pan which rides on the surface of the soil. The apparatus causes continuous injection from a plurality of nozzles. The shield-pan minimizes clogging of the nozzles. A second low pressure system is incorporated to broadcast spray the soil surface utilizing a boom with broadcast nozzles.

U.S. Pat. No. 4,624,193 discloses a liquid injection apparatus for delivering liquid pulses with a high pressure metering pump. Injection pressure is maintained at 1800 to 2200 p.s.i. A nitrogen gas accumulator and a safety relief valve are used. The system has a series of jet nozzles, one for each plant row, spaced along a tool bar carried by a tractor which normally tows a nurse tank containing the liquid. A pump having an adjustable delivery rate is driven at a rate proportional to ground speed of the tractor, normally by the power take-off of the tractor, to deliver liquid from the nurse tank under substantially constant high pressure. A timing distributor, also driven by the power take-off, connects the high pressure liquid, i.e., the pump output, successively to the nozzles so that the entire output of the pump is concentrated through one nozzle at a time, for a very brief interval, to inject a high velocity slug of liquid which will penetrate the soil to an agronomically satisfactory depth. The timing is such that one slug is injected for each nozzle during a predetermined distance of travel, e.g., twelve inches, to provide a series of equally spaced injections along each plant row.

U.S. Pat. No. 5,207,168 discloses a system for reducing soil density. A metering valve, a plurality of jets, an accumulator and a suitable pressure relief valve are used to provide a lateral dispersion of the liquid within the soil such that the liquid dispersion from adjacent jets coact with one another to lift and fracture the soil. A plurality of small diameter nozzles are mounted on a movable frame generally transverse to the direction of travel of the frame. A pressurized fluid source is mounted on the frame and connected through a control device to the nozzles. The control device controls the flow of liquid from the pressure source to the nozzles to produce periodic, relatively small cross-sectional, slugs, or jets, of liquid from the nozzles through the turf into the soil. The pressure on each slug of liquid is such that the liquid penetrates through the turf into the soil and also disperses generally laterally within the soil.

U.S. Pat. No. 4,481,894 discloses a herbicide spreader with nozzles, a pump, air compressor, and reservoir for producing pulses for injection.

U.S. Pat. No. 3,012,526 discloses a liquid injection system with vent apparatus to inject agricultural chemicals into the soil from a moving vehicle by propelling elongated consolidated slugs of liquid at high velocity so that the unconfined slugs are caused to penetrate the soil while substantially intact and before breaking up to any considerable degree. The slug is propelled from an ejector device positioned in close proximity to the soil, for example, within a fraction of an inch thereof. Penetration depths of six to eight inches or more are readily achieved with pressures of 500 p.s.i. to 1500 p.s.i., depending on the condition of the soil.

U.S. Pat. No. 4,009,666 discloses apparatus for injecting a fluid below a soil or turf surface having a handle with a support rod attached thereto, and a plurality of nozzles carried by the support rod, each nozzle forming a stream of fluid passing therethrough. Each nozzle is provided with a skid having a curved surface for low friction contact with the soil or turf surface and for holding the nozzle out of contact with the surface. The apparatus is provided with a pump which cooperates with the nozzle to inject the fluid substantially below the soil surface.

U.S. Pat. No. 2,988,025 discloses a method for applying liquids into soil with liquid injected at velocities of the order of 700 to 1,100 feet per second to obtain penetration depths that are satisfactory from the point of view of agronomy, e.g., of the order of four inches or more.

U.S. Pat. No. 2,930,334 discloses apparatus for soil treatment by injecting fertilizer into soil in the form of a liquid to a depth at which the fine tendrils of roots are enabled to readily absorb the plant food for the nourishment of the plants. Weeds competing with the plants being cultivated are killed more quickly and effectively by injecting the weed killer in the form of a liquid into the ground at such depth that the roots of the weeds become quickly subjected to the destructive properties of the weed killer. This method is satisfactory for controlling plant killing grubs or insects that exist in the ground.

Certain prior art systems employ commercially available prior art sequencing control valves, but some of these systems have difficulty due to the need for manual adjustment of the valve.

SUMMARY OF THE PRESENT INVENTION

The present invention, in one embodiment, discloses a soil injection system with a holding tank (preferably vented) for holding and conditioning material to be injected. In one embodiment, a tank holds about three hundred gallons of material. This material includes, but is not limited to, fluids and herbicides, pesticides, fertilizers, water, and may include substances e.g. water-soluble materials, time-release materials, chemicals, fertilizers, or polymers for enhancing water-retention. In one aspect air under pressure is sprayed into the material to be injected, e.g. from a manifold located near the bottom of the holding tank. This air serves to turbulently and thoroughly mix the material and/or fluid together. The air is pressurized by an air compressor (e.g. up to 120 p.s.i.) in fluid communication with the manifold. A pressure indicating gauge indicates air pressure in a line between the compressor and the manifold. Water is supplied to the tank from a water supply source. The water is, preferably, filtered. Preferred filters in certain embodiments are a 3 micron or 5 micron filter. An inlet valve controls water flow into the tank.

A relief line interconnected between an inlet line to the transfer pump and the transfer pump relief valve may be re-directed back to the tank's air manifold for further mixing of the material therein.

A low pressure transfer pump (e.g. with a pumping rate of about 25 gallons per minute) pumps fluid from the holding tank to a high pressure pumping system, e.g. through a hose connected via a hose "quick connect" connection. For safety, a relief valve may be used on the flow line between the transfer pump and the high pressure pumping system, e.g. set at about seventy-five p.s.i. In the high pressure pumping system, fluid flows past another quick connect connection and a one-way check valve to a typical high pressure triplex pump, e.g. with a 20 HP engine. A bleed off dump/drain valve is, preferably, located in the flow line between the one-way check valve and the triplex pump and a pressure indicating gauge may also be used on this line to indicate inlet fluid pressure, typically up to 100 p.s.i. The triplex pump raises the fluid pressure to a desired level, e.g. between 6000 and 12000 p.s.i.

Preferably the triplex pump is in fluid communication via a flow line with a bleed valve for system flushing to relieve pump head pressure prior to starting the pump. An outlet pressure gauge on this flow line indicates the outlet pressure of fluid from the triplex pump. A relief/dump valve is, preferably, interconnected between an inlet to and an outlet from the triplex pump to protect the triplex pump from over-pressurizing. Also, preferably, a rupture disc assembly is interconnected between the triplex pump outlet and the relief/dump valve for providing relief to the atmosphere if the relief valve fails.

A sequencing system regulates the flow of pumped fluid to a nozzle apparatus at a desired pressure (e.g. between about 4000 p.s.i. and 12000 p.s.i.) and at a desired flow rate, (e.g. between 6 to 8 gallons per minute and up to 60 gallons a minute, or more). The triplex pump pumps the fluid to a sequencing system. Via a flow line interconnected between the sequencing system and the nozzle apparatus, the sequencing system pumps pulses of the fluid at a desired amount, pulse rate and pressure. A control shut-off valve is, preferably, disposed on this flow line. It may be manually operable. The nozzle apparatus may be mounted behind a tractor or on a device with a handle for control and manipulation by a human operator.

Regulation of flow to the nozzle apparatus is achieved, in one embodiment, by supplying air under pressure to the sequencing system via a hose which is, preferably, connectible to the air compressor with quick-connect connections. Air flows through an adjustable block valve to a manual relief-type regulator. Air from the compressor is supplied by the regulator to a diaphragm of the sequencing control valve. By increasing or decreasing the air pressure supplied to the diaphragm by adjusting the regulator, the sequencing or pulsing of material to an injection manifold with nozzles is adjusted. An increase in pressure slows the rate of material injection; a decrease in pressure increases the rate of material injection. The regulator includes a sequencing control valve which provides pulses of fluid to the nozzle apparatus. The regulator is disposed in a flow line between the inlet to the sequencing system (from the triplex pump) and the nozzle apparatus. The regulator includes a sequencing control valve which, in various embodiments, may be controlled manually, electrically, or pneumatically and used within the scope of this invention. Between the sequencing control valve and the nozzle apparatus an on/off control valve is, preferably, used to begin or to stop material injection and to automatically place the high pressure pumping system into a bypass mode.

In the nozzle apparatus itself, in one embodiment, a precision balancing check valve (e.g. a fixed back pressure relief valve set at about 150 p.s.i.) holds the force of the pressurized fluid for a predetermined amount of time and then releases it to effect pulsation of fluid to the nozzles. Nozzle orifice size may be selected as desired depending on number of nozzles, fluid to be injected, and nature of the soil into which the fluid is to be injected. In one embodiment there are ten nozzles, each with an orifice size of 0.032 inches and fluid is pulsed to them at three to four second time intervals, to achieve soil penetration of about six inches. In certain embodiments fifty gallons per minute are pumped through thirty five nozzles on a manifold twenty four feet long. According to this invention the size of orifices and the number of nozzles may be adjusted for use with different high pressure pump capacities. In the embodiment above with ten nozzles, about ninety percent efficiency is achieved with an injection pressure of about 4000 p.s.i. and a flow rate of about 5.5 gallons per minute. Pulsation can be from three second pulses up to thirty second pulses or more. The manifold can be set at any desired height above the soil, e.g. from one to eighteen inches, or more.

A gas accumulator receives fluid under pressure from the triplex pump. Gas (e.g. nitrogen) in the accumulator is compressed as the accumulator fills with a charge of fluid from the triplex pump. A sensing line, interconnected between a line from the accumulator to the sequencing control valves conveys a signal to the sequencing control valves when the charge has reached a predetermined pressure (e.g. 1800 p.s.i.), opening the sequencing control valve and permitting the charge of fluid to flow to the nozzle apparatus. A pressure gauge may be used on the inlet line to indicate fluid pressure therein. A relief valve on this line (e.g. a manual drain and balancing valve) provides a safety drain for the system and access for system testing. This valve and the nozzle apparatus may be mounted on a separate personnel-movable mount. The triplex pump, its associated apparatus, and the sequencing system may be separately mounted on a skid or trailer.

It is, therefore, an object of at least certain preferred embodiments of the present invention to provide:

New, useful, unique, efficient, nonobvious devices and methods for injecting materials and fluids into soil;

Such devices and method including the introduction of air under pressure to assist in mixing of fluids and/or materials;

Such devices and methods for injecting about four to about sixty, and preferably in certain embodiments five to about eight gallons per minute of fluid and/or materials into soil;

Such devices and methods including an accumulator for delivering a pulse of fluid through a sequencing valve to nozzles;

Such devices and methods with precise non-manual adjustment of pulsation;

Such devices and methods for the effective injection of water-soluble materials, chemicals and/or polymers for water-retention enhancement; and Such devices and methods employing one or more safety apparatuses, including e.g. rupture disk assemblies, check valves, relief valves, dump valves, etc.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
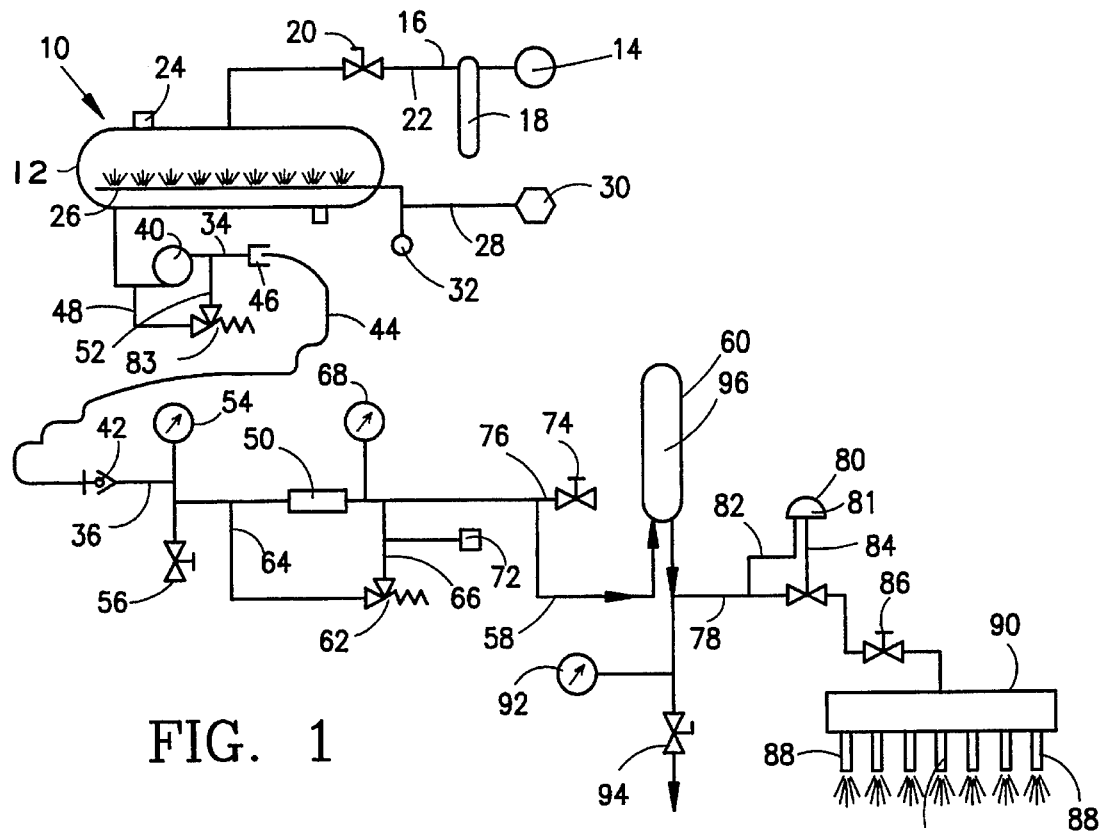
FIG. 1 is a schematic view of a system according to the present invention.

Referring now to FIG. 1, a system 10 according to the present invention has a holding tank 12 (preferably a vented tank to inhibit over pressurization) for holding fluid and/or fluid with material to be injected into soil. Fluid is supplied to the tank 12 from a fluid supply source 14 through a flow line 16. Preferably the fluid is passed through a filter 18. Materials to be added to the tank are added either to the fluid supply source 14, into the flow line 16 at a point 22, or into the tank through an inlet 24. A valve 20 controls flow in the line 16.

Air under pressure is supplied into the tank from a manifold 26 with multiple air outlet holes through a flow line 28 from an air compressor 30. A gauge 32 indicates air pressure in the flow line 28. This pressurized air helps to mix fluid and materials in the tank 12. In one aspect air is supplied at about 120 p.s.i.

A transfer pump 40 pumps fluid through a flow line 34 to a flow line 36 for introduction to a triplex pump 50. In a tractor mounted system according to the present invention, items forward from and including a connection 42 are mounted on a tractor (not shown). A hose 44 interconnects the two flow lines 34 and 36 at connections 42 and 46.

Flow lines 34 and 36 may be relieved by a through a line 48 by a relief valve 83. The valve 83 provides relief of the flow line 34 via an interconnection with it through a flow line 52 and to the flow line 36 via interconnection with a flow line 44 (e.g. a hose). In one particular embodiment the relief valve 83 is set to open at a line pressure of between about 83 and 75 p.s.i. (e.g. when the inlet of the pump 50 has a maximum inlet rating of 80 p.s.i.)

A gauge 54 indicates fluid pressure in the flow line 36 and an inlet drain valve 56 provides for draining and testing the system.

The triplex pump 50 pumps fluid at a relatively high pressure through a flow line 58 to an accumulator 60. A relief/dump valve 62 provides relief to the flow lines 76 and 58 via flow lines 64 and 66. The valve 62 acts as a relief valve for over pressurization protection and as an automatic dump valve when the valve 86 on the tractor unit is placed in an OFF position. The valve 62 will remain in an open (dump) position until the valve 86 is placed in an ON position for injection. A gauge 68 indicates line pressure in the flow line 58. For added safety, a high pressure rupture disc assembly 72 e.g. with a disc that ruptures at a pressure of e.g. about 6500 p.s.i. is interconnected with the outlet side of the triplex pump 50 to provide quick pressure relief in the event of a failure of the valve 62. A valve 74 in fluid communication with the flow line 58 via a flow line 76 provides for bleeding of fluid for the pump 50, relieving pressure on the pump discharge. The motor on the pump 50 will not start under a load.

A charge of a volume of fluid under pressure, pumped by the triplex pump 50 into the accumulator 60, builds up in the accumulator 60 and in a flow line 78 until a sequence control valve 80 with a diaphragm 81 senses via a sensing line 82 that a pre-set line pressure has been reached. At this point the valve 80 opens allowing the accumulated fluid charge to flow through a flow line 84 to a tractor mounted nozzle apparatus 90. The accumulator contains an amount of a gas, e.g. nitrogen gas 96. An on/off adjustable control valve 86 operable from a tractor, controls flow in the line 84. The nozzle apparatus 90 has a plurality of nozzles 88. Preferably each nozzle has an associated back pressure check relief valve (as the valve 106, FIG. 2).

A gauge 92, e.g. mounted on the tractor, indicates the level of line pressure in the flow line 78. A manually-operable drain and balancing valve 94 permits draining and testing of the system.

Figure 2:
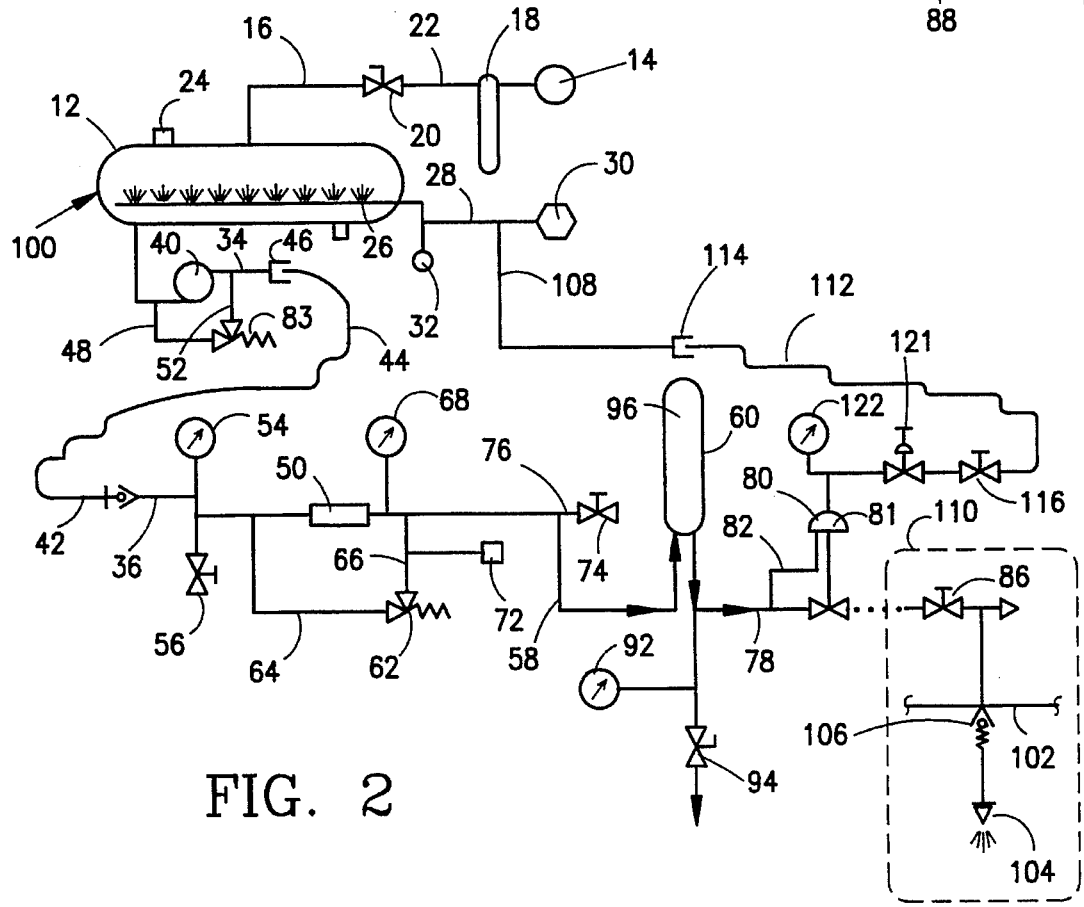
FIG. 2 is a schematic view of a system according to the present invention.

FIG. 2 illustrates a system 100 according to the present invention like the system 10 (FIG. 1) and in which like numerals indicate like items. In the system 100 the control valve 86 and the items shown as beneath it in FIG. 2 are mounted to a wheeled personnel-operable personnel-movable apparatus 110 with a handle (not shown) and an injection unit manifold 102 having one and preferably a plurality of injection jet nozzles 104. A plurality of fixed back pressure check relief valves 106, one for each nozzle, on the manifold are set at a desired pressure, e.g. about 150 p.s.i. to prevent fluid drain between pulses, to act as a backpressure device, and for rapid opening and closing so that the time from full open to full closed is relatively low for each pulse. Valve no. UE 08A0639 from Kepner Products Company is suitable for this. Compressed air from the compressor 30 is supplied through a flow line 108 and a hose 112 connected at a connection 114 to the sequencing control valve 80 through a block valve 116.

In one preferred embodiment of systems according to this invention, fluid is jetted from the nozzles with the orifice ends about one-quarter of an inch above the surface of soil so that less than five percent and most preferably less than one percent of the jetted fluid remains on the soil surface. Thus surface run-off of materials is decreased, jetted material is less likely to become air-borne, and lesser amounts of chemical(s) may be used to achieve desired effects. In one embodiment this is accomplished with nozzles having an orifice opening of about 0.032 inches in diameter with fluid supplied to them at about 4500 p.s.i. pressure with pulses of about one-half second time duration. Preferably at a depth of about six to about eight inches in the soil a cone of spray from such nozzles has a diameter of about six inches.

In an embodiment of one method according to this invention using apparatus as in FIG. 1 according to this invention, material to be injected into soil, e.g. but not limited to chemical(s) in liquid form (e.g. mixed with water) are poured into the tank 12 through the inlet 24. Water is added to the tank 12 via line 16 through fluid supply source 14 and through filter 18. Once the tank 12 is filled, the compressor 30 is started and air flows through the line 28 into the tank manifold 26 facilitating thorough mixing together of the chemical(s) and water. The hose 44 connected from a trailer mounted unit (which includes the tank 12, the compressor 30, and the transfer pump 40) to the tractor mounted system (which includes the nozzle apparatus 90 and control valve 86). The valve 56 is opened and the pump 40 is started. The valve 56 is closed and the pressure is indicated on the gauge 54 (at the pump inlet of the high pressure triplex pump 50). The valves 74 and 94 are opened and then pump 50 is started. The valves 74 and 94 are closed and pressure gauge 92 reads "0". The valve 86 is opened and the gauges 92 and 68 read between 2500 and 4000 p.s.i. Pulsation starts at the manifold 90 through jets 88. By manually adjusting the sequencing valve 80 the rate of pulsation can be changed. By placing the valve 86 to the OFF position (closed) the pulsation stops and the gauges 92 and 68 read "0". Pressure from the high pressure triplex pump 50 is transmitted to the accumulator 96 with a nitrogen precharge of 1800 p.s.i. The pressure in the accumulator 96 begins to rise and continues to rise until the pressure reaches the preset pressure setting of the sequencing valve 80 (e.g. 300 p.s.i.). Once this preset pressure is reached the sequencing valve 80 opens allowing a pulse of fluid (pressure) to travel to the jets 88. The sequencing valve 80 has a reset dead band, e.g. of 200 p.s.i. (e.g. it opens at 2500 p.s.i. and closes at 2300 p.s.i.). The slug of fluid sent to the jet manifold 90 overcomes the back pressure valves (not shown) (set, e.g. at 150 p.s.i.) at each jet and a single pulse occurs. The back pressure valves close at a preset level, e.g. 150 p.s.i. By changing the parameters of pump speed and accumulator pre-charge; by adjusting valve 86 or valve 80; or by adjusting the pre-set pressure sensed by the sequencing control valve 80 the rate and duration of pulses can be adjusted.

In one embodiment of a method according to this invention using apparatus according to this invention as in FIG. 2 the sequencing control valve 80 is adjustable by utilizing air pressure from the compressor 30. The manual regulator 121 is manually adjusted to change the pressure level of the compressed air supplied to the sequencing control valve 80 and a pressure gauge 122 indicates pressure level (e.g. from 0 to 100 p.s.i.). A block valve 116 can be closed to stop air flow to the sequencing control valve 80. Turning a regulator control knob 121 allows air pressure to be applied to the diaphragm 81 of the sequencing valve 80; thus air ranging in pressure from 5 to 85 p.s.i. provides precision pneumatic adjustment of the sequencing control valve 80's output, e.g. from 200 to 4500 p.s.i.

Natural corn starch (biodegradable) or synthetic polymers are, in one embodiment, applied with water with a system according to this invention. Such materials, preferably, absorb between about 100 and about 600 times their own weight. Polymers, e.g. commercially available "Sta Wet" polymer from International Polymer, Inc. and "Terra Sorb" polymer from Terra Sorb Co. are added into the tank 12 as desired and are mixed, usually with water. In one embodiment a thin slurry is formed which is, e.g., between about 15% to about 40% polymer (or corn starch) by weight.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A fluid injecting system for injecting fluid into soil, the system comprising
   a tank for receiving and from which is discharged the fluid,
   mixing means in the tank for mixing the fluid,
   a transfer pump in fluid communication with the mixing tank,
   a pressure pump, the transfer pump in fluid communication with the pressure pump for pumping fluid to sequencing pumping means,
   sequencing pumping means for providing sequential pulses of fluid to a nozzle apparatus,
   nozzle apparatus with at least one nozzle through which fluid is injected into the soil, the sequencing pumping means in fluid communication with the nozzle apparatus,
   accumulator apparatus for accumulating a charge of fluid pumped thereto from the pressure pump, and
   the sequencing pumping means having sensing apparatus to sense a pressure level of the charge of fluid in the accumulator apparatus, and the sequencing pumping means having opening apparatus which opens when a pre-set pressure level of the charge of fluid is sensed, permitting the charge of fluid to flow to the nozzle apparatus.

2. The system of claim 1 wherein the mixing means comprises apparatus for supplying compressed air into the tank to facilitate fluid mixing therein.

3. The system of claim 2 wherein the apparatus for supplying compressed air comprises
   a manifold with multiple air escape holes, and
   the manifold extending along a substantial portion of an interior bottom of the tank.

4. The system of claim 1 wherein the sequencing pumping means further comprises
   pneumatic control apparatus for pneumatically controlling rate of pulsation of the pulses.

5. The system of claim 4 wherein the mixing means comprises apparatus for supplying compressed air into the tank and said apparatus also provides compressed air for the pneumatic control apparatus.

6. The system of claim 4 wherein the pneumatic control apparatus further comprises
   a control diaphragm on a sequencing control valve, and
   a regulator for adjustably supplying compressed air to the control diaphragm to regulate the rate of pulsation.

7. The system of claim 1 wherein the fluid comprises water and at least one chemical.

8. The system of claim 1 wherein the fluid comprises water and a water-retention polymer.

9. The system of claim 1 further comprising
   a control valve for controlling fluid flow from the sequencing pumping means to the nozzle apparatus.

10. The system of claim 9 further comprising
    a relief valve intercommunicating with the pressure pump and the control valve, the relief valve automatically opening to relieve the system when the control valve is closed.

11. The system of claim 10 wherein
    the at least one nozzle is ten nozzles,
    each nozzle has an orifice opening of about 0.032 inches in diameter,
    fluid is supplied to the nozzles at about 4500 p.s.i., and
    pulses have a duration of about one-half second.

12. The system of claim 11 wherein a back pressure check valve is disposed in line between each nozzle and the control valve.

13. A fluid injecting system for injecting fluid into soil, the system comprising
    a tank for receiving and from which is discharged the fluid,
    mixing means in the tank for mixing the fluid, the mixing means comprising apparatus for supplying compressed air into the tank to facilitate fluid mixing therein and having a manifold with multiple air escape holes, the manifold extending along a substantial portion of an interior bottom of the tank,
    a transfer pump in fluid communication with the mixing tank,
    a pressure pump, the transfer pump in fluid communication with the pressure pump for pumping fluid to sequence pumping means,
    sequencing pumping means for providing sequential pulses of fluid to a nozzle apparatus,
    nozzle apparatus with at least one nozzle through which fluid is injected into the soil, the sequencing pumping means in fluid communication with the nozzle apparatus,
    pneumatic control apparatus for pneumatically controlling rate of pulsation of the pulses, the apparatus for supplying compressed air into the tank also providing compressed air for the pneumatic control apparatus,
    the pneumatic control apparatus comprising a control diaphragm on a sequencing control valve, and a regulator for adjustably supplying compressed air to the control diaphragm to regulate the rate of pulsation,
    accumulator apparatus for accumulating a charge of fluid pumped thereto from the pressure pump, and
    the sequencing pumping means having sensing apparatus to sense a pressure level of the charge of fluid in the accumulator, and the sequencing pumping means having opening apparatus which opens when a pre-set pressure level of the charge of fluid is sensed, permitting the charge of fluid to flow to the nozzle apparatus.

14. A method for injecting fluid into soil, the method comprising
    introducing fluid into a tank,
    mixing the fluid in the tank,
    pumping the fluid from the tank to a pressure pump,
    pumping the fluid with the pressure pump to accumulator apparatus, accumulating in the accumulator apparatus a charge of fluid pumped thereto by the pressure pump, sensing with sensing apparatus in a sequencing pumping means a pressure level of the charge of fluid in the accumulator apparatus, the sequencing pumping means having opening apparatus which opens when a pre-set pressure level of the charge of fluid is sensed, permitting the charge of fluid to flow to the nozzle apparatus, providing sequential pulses of the fluid to nozzle apparatus with the sequencing pumping means, and injecting the fluid into the soil with the nozzle apparatus.

15. The method of claim 14 further comprising pneumatically adjusting duration of the sequential pulses of fluid.

16. The method of claim 15 wherein the mixing is accomplished by supplying compressed air into the tank from a compressed air source and the compressed air source supplies air under pressure to pneumatic control means for pneumatically adjusting the duration of the sequential pulses of fluid.

17. The method of claim 14 wherein the mixing is accomplished by supplying compressed air to an interior of the tank.

18. The method of claim 14 further comprising controlling flow of fluid to the nozzle apparatus with a control valve on a fluid line from the sequencing pumping means to the nozzle apparatus and relieving pressure in the system when the control valve is closed by opening a relief valve in fluid communication with the control valve.

\* \* \* \* \*